Oct. 4, 1966

E. H. PAUFVE 3,277,380

BIDIRECTIONAL COUNTER

Filed Dec. 17, 1962

3 Sheets-Sheet 1

INVENTOR
ELDRED H. PAUFVE
BY [signature]
ATTORNEY

Oct. 4, 1966 E. H. PAUFVE 3,277,380

BIDIRECTIONAL COUNTER

Filed Dec. 17, 1962 3 Sheets-Sheet 2

INVENTOR
ELDRED H. PAUFVE
BY [signature]
ATTORNEY

Oct. 4, 1966 E. H. PAUFVE 3,277,380

BIDIRECTIONAL COUNTER

Filed Dec. 17, 1962 3 Sheets-Sheet 3

INVENTOR
ELDRED H. PAUFVE

BY [signature]
ATTORNEY

3,277,380
BIDIRECTIONAL COUNTER

Eldred H. Paufve, Binghamton, N.Y., assignor to General Precision, Inc., Binghamton, N.Y., a corporation of Delaware Filed Dec. 17, 1962, Ser. No. 244,986
4 Claims. (Cl. 328—42)

This invention relates to a bidirectional counter and more particularly to a bidirectional counter which accepts forward and reverse pulse counts in any sequence without auxiliary steering circuits.

In general, electronic counters of the prior art employ a number of serially connected binary flip-flops with the output of the first providing the input for the second, the output of the second providing the input for the third, etc. In general, in order to obtain a decimal output indication, four flip-flops are connected in series combination together with complex feedback connections between selected stages so that ten pulses applied to the input of the cascaded flip-flops is effective, in combination with the feedback pulses, to generate an output indication upon the application of the tenth pulse rather than upon the application of the sixteenth pulse as would result if feedback were not employed.

Recently, bidirectional electronic counters have been developed, as shown in U. S. Patent 2,604,004 by way of example, wherein each of the cascaded flip-flops has associated therewith an auxiliary steering circuit to determine whether the total count is to be increased or decreased.

According to the present invention, however, there is provided an improved bidirectional electronic counter which requires five flip-flops per decade stage without employing either complex feedback or steering circuitry and which is readily converted from a decade counter to one counting to any other even radix by means of the addition or deletion of one or more of the flip-flops. Briefly stated, in the decade counter embodiment of the invention, five flip-flops are connected in a mobius arrangement, with both the up signal, that is a signal effective to increase the total count, and the down signal, that is a signal effective to decrease the total count, parallelly connected to each flip-flop. Assuming all flip-flops initially set to the 0 state, the first up signal switches only the first flip-flop to the 1 state, the second up signal switches only the second flip-flop to the 1 state leaving the first unchanged, the third up signal changes the third flip-flop, etc., until all five flip-flops are in 1 state. Next, the sixth up signal initiates the process all over again, this time, however, changing the flip-flops from the 1 state to the 0 state in the same sequence as before. The analogy to the Mobius ring results from the fact that the single ring must be traversed twice to arrive back at the starting point, and, as will be apparent as the description proceeds, the connections between individual flip-flops are the same excepting those between the fifth and first which are reversed.

Note should be made of the fact that the bidirectional counter of the present invention is inherently faster than the counters of the prior art, since, as a result of the parallel connection of the input signal, no more than one flip-flop changes state in any one decade, regardless of the number of decade stages in the counter. Further note should be made of the fact that, additionally, no penalty is paid in the way of speed for providing bidirectionality, since the necessary steering signals from the preceding and subsequent stages are already present at the stages to be flipped, merely awaiting either the next up or down signal.

It is an object of the invention, therefore, to provide an improved bidirectional electronic counter.

Another object of the invention is to provide a parallelly connected bidirectional counter.

A further object of the invention is to provide improved circuitry for coupling decade bidirectional counters one to another.

Still another object of the invention is to provide a multi-stage bidirectional counter free from ripple carry phenomena.

Yet another object of the invention is to provide a bidirectional electronic counter without employing auxiliary steering circuits.

A still further object of the invention is to provide an electronic counter which counts bidirectionally with no penalty in speed for count direction reversal.

These and other objects, features, and advantages of the invention will be apparent from the following detailed description of a preferred embodiment thereof as illustrated in the accompanying drawings in which.

Figure 1:
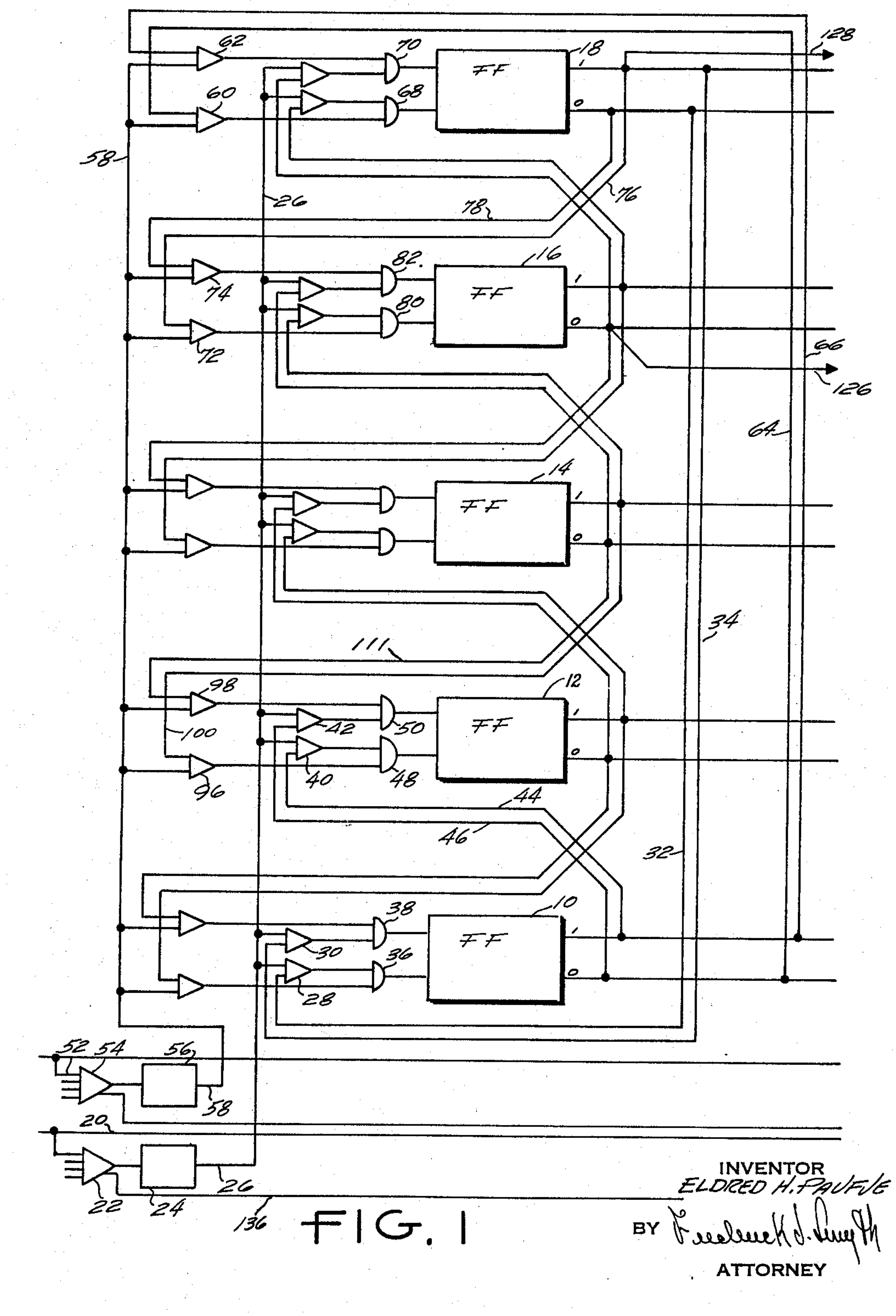
FIG. 1 is a block diagram of a preferred embodiment of the decade bidirectional counter of the invention.

Referring now to the drawings, FIG. 1 is a block diagram of the decade embodiment of the bidirectional counter of the invention. As there shown, the counter includes five identical flip-flops 10, 12, 14, 16, and 18 with the output of each being connected to logic circuitry in the input of both the preceding flip-flop and the succeeding flip-flop, so as to form a 5-element ring circuit. Each flip-flop has a set input to change the state thereof from 0 to 1 and a reset input to change the state from 1 to 0. The up signal is coupled along a line 20, through an AND circuit 22 and an emitter follower 24. AND circuit 22 is employed when more than one decade is used to develop several significant figures, and the operation thereof will be more particularly hereinafter described. The output of emitter follower 24 is fed to a line 26 which parallelly connects to the set and reset inputs of all five flip-flops. By way of example, line 26 is connected to one input of AND circuits 28 and 30 coupled to flip-flop 10. The second inputs to AND circuits 28 and 30 are derived from the output of the preceding flip-flop, in this case flip-flop 18, with the 0 output thereof being connected to AND circuit 28 along a line 32 and the 1 output being connected to AND circuit 30 along a line 34. The outputs of AND circuits 28 and 30 are fed through OR circuits 36 and 38 to the set and reset inputs of flip-flop 10, respectively. Continuing, line 26 is also connected to one input of AND circuits 40 and 42 coupled to flip-flop 12. In a manner similar to that described above with reference to flip-flop 10, the second inputs to AND circuits 40 and 42 are derived from the output of the preceding flip-flop, in this case, flip-flop 10, with the 1 output thereof being connected to AND circuit 40 along a line 44 and the 0 output being connected to AND circuit 42 along a line 46. Again, the outputs of AND circuits 40 and 42 are fed through OR circuits 48 and 50 to the set and reset inputs of flip-flop 12, respectively. Finally, it should now be apparent that line 26 is coupled to flip-flops 12, 14, 16, and 18 in exactly the same manner as it is coupled to flip-flop 12.

Up signals provided by line 26 are coupled to the set and reset inputs of flip-flops 12, 14, 16, and 18 together with the 1 and 0 outputs, respectively, of the preceding stage, and to the set and reset inputs of flip-flop 10 with, however, the 0 and 1 outputs of the preceding stage 18 interchanged. The importance of this feature will be readily apparent from the description of the circuit operation below.

The down signals are coupled to each of the flip-flops in a manner which is essentially a mirror image of the coupling of the up signals to the flip-flops, wherein the down signals applied to a given stage are combined with the output of the *succeeding* stage rather than with the output of the *preceding* stage. The down signal is coupled along a line 52, through an AND circuit 54 and an emitter follower 56. Again AND circuit 54 is employed when more than one decade is used, as will be understood as the description proceeds. The output of emitter follower 56 is fed to a line 58 which is parallelly connected to the set and reset inputs of all five flip-flops. By way of example, line 58 is connected to one input of AND circuits 60 and 62 coupled to flip-flop 18. The second inputs to AND circuits 60 and 62 are derived from the output of the next succeeding flip-flop, in this case flip-flop 10, with the 0 output thereof being connected to AND circuit 60 along a line 64 and the 1 output being connected to AND circuit 62 along a line 66. The outputs of AND circuits 60 and 62 are fed through OR circuits 68 and 70 to the set and reset inputs of flip-flop 18, respectively. Continuing, line 58 is also connected to one input of AND circuits 72 and 74 coupled to flip-flop 16. In a manner similar to that described above with respect to flip-flop 18, the second inputs to AND circuits 72 and 74 are derived from the next succeeding flip-flop, in this case flip-flop 18, with the 1 output thereof being connected to AND circuit 72 along a line 76 and the 0 output being connected to AND circuit 74 along a line 78. Again the outputs of AND circuits 72 and 74 are fed through OR circuits 80 and 82 to the set and reset inputs of flip-flop 16, respectively. Finally, it should also be now apparent that line 58 is coupled to flip-flops 14, 12, and 10 in exactly the same manner as it is coupled to flip-flop 16.

Down signals provided by line 58 are coupled to the set and reset inputs of flip-flops 10, 12, 14 and 16 together with the 1 and 0 outputs, respectively, of the next succeeding stage, while the down signals are coupled to the set and reset inputs of flip-flop 18 together with the 0 and 1 outputs of the next succeeding stage 10 relatively reversed. Thus, the flip-flop interconnections are the same throughout the circuit of FIG. 1, except for the interconnections between flip-flops 10 and 18 which are reversed, and hence the analogy to a Mobius strip.

Turning now to the operation of the circuit of FIG. 1, consider first the case in which all of the flip-flops are reset to the 0 state and only up signals are applied thereto. The first up signal provided by line 26 is, as described above, parallelly coupled to the set and reset inputs of all of the flip-flops. At this time, however, the AND circuits in series with the set input of flip-flops 12, 14, 16, 18 are effectively blocked since the second input thereto originates from the deenergized 1 output of the preceding flip-flop. However, AND circuit 28 coupled to flip-flop 10 has its second input connected by line 32 to the energized 0 output of flip-flop 18 and therefore the first up signal passes through AND circuit 28 and OR circuit 36 to set flip-flop 10 to the 1 state. Also, the first up signal tends to reset flip-flops 12, 14, 16 and 18 to the 0 state, but since these are already in the 0 state, the first up signal has no effect on these flip-flops and such action will not be further described herein.

The second up signal also passes through AND circuit 28 and OR circuit 36, tending to set flip-flop 10 to the 1 state, but, flip-flop 10 is in the 1 state and the second up signal has no effect thereon and such action also will not be further described herein. Also, at this time the second up signal has no effect on the state of flip-flops 14, 16, and 18 since the AND circuits in series with the set input thereof still have their second input connected to the deenergized 1 output of the preceding flip-flop. However, AND cricuit 40 is connected to the now energized 1 output of flip-flop 10 and therefore the second up signal passes through AND circuit 40 and OR circuit 48 to set flip-flop 12 to the 1 state. Thus at the end of the second up signal flip-flops 10 and 12 have been transferred to the 1 state. Continuing in like manner, it is obvious that the third up signal transfers only flip-flop 14 to the 1 state, the fourth up signal transfers only flip-flop 16 to the 1 state, and the fifth up signal transfers only flip-flop 18 to the 1 state. Thus at the termination of the fifth up signal all five flip-flops have been transferred to the 1 state.

Application of the sixth up signal to the circuit of FIG. 1 is next effective to reset flip-flop 10 to the 0 state. At the time the sixth up signal is provided by line 26, the AND circuits in series with the reset input of flip-flops 12, 14, 16, and 18 are effectively blocked since the second input thereto originates from the deenergized 0 output of the preceding flip-flop. However, AND circuit 30 coupled to flip-flop 10 has its second input connected by line 34 to the now energized 1 output of flip-flop 18 and therefore the sixth up signal passes through AND circuit 30 and OR circuit 38 to reset flip-flop 10 to 0 state. The seventh up signal is next effective to reset flip-flop 12 to the 0 state since AND circuit 42 has its second input connected to the now reenergized 0 output of flip-flop 10, the eighth up signal resets flip-flop 12 and the ninth up signal resets flip-flop 16. Thus it has been shown that a succession of up signals is effective to first set the flip-flops in one sequence and thereafter reset the flip-flops in the same sequence as indicated by Table I:

TABLE I

| Up Signal Number | Flip-Flop Number | | | | |
|---|---|---|---|---|---|
| | 10 | 12 | 14 | 16 | 18 |
| 0 | 0 | 0 | 0 | 0 | 0 |
| 1 | 1 | 0 | 0 | 0 | 0 |
| 2 | 1 | 1 | 0 | 0 | 0 |
| 3 | 1 | 1 | 1 | 0 | 0 |
| 4 | 1 | 1 | 1 | 1 | 0 |
| 5 | 1 | 1 | 1 | 1 | 1 |
| 6 | 0 | 1 | 1 | 1 | 1 |
| 7 | 0 | 0 | 1 | 1 | 1 |
| 8 | 0 | 0 | 0 | 1 | 1 |
| 9 | 0 | 0 | 0 | 0 | 1 |

Next, consider the case in which all of the flip-flops are again reset to the 0 state and only down signals are applied thereto. The first down signal provided by line 58 is, as described above, parallelly coupled to the set and reset inputs of all of the flip-flops. At this time, however, the AND circuits in series with the set input of flip-flops 10, 12, 14, and 16 are effectively blocked since the second input thereto originates from the deenergized 1 output of the next succeeding flip-flop. However, AND circuit 60 coupled to flip-flop 18 has its second input connected by line 64 to the energized 0 output of flip-flop 10 and therefore the first down signal passes through AND circuit 60 and OR circuit 68 to set flip-flop 18 to the 1 state. As further down signals are applied to the circuit of FIG. 1, it should be apparent that the flip-flops are energized in accordance with Table II:

| Down Signal Number | Flip-Flop Number | | | | |
|---|---|---|---|---|---|
| | 10 | 12 | 14 | 16 | 18 |
| 0 | 0 | 0 | 0 | 0 | 0 |
| 1 | 0 | 0 | 0 | 0 | 1 |
| 2 | 0 | 0 | 0 | 1 | 1 |
| 3 | 0 | 0 | 1 | 1 | 1 |
| 4 | 0 | 1 | 1 | 1 | 1 |
| 5 | 1 | 1 | 1 | 1 | 1 |
| 6 | 1 | 1 | 1 | 1 | 0 |
| 7 | 1 | 1 | 1 | 0 | 0 |
| 8 | 1 | 1 | 0 | 0 | 0 |
| 9 | 1 | 0 | 0 | 0 | 0 |

A comparison of Tables I and II shows that ten consecutive up signals are effective to cause the counter to progress sequentially from a count of 0 to 9 while the ten consecutive down signals are effective to cause the counter to progress sequentially from a count of 0 to 9. Thus, it has been shown that the circuit of FIG. 1 is truly a bidirectional counter. It should also be noted that intermixed up and down signals can be applied to the counter, since, after acting in response to either an up or down signal, the flip-flops are automatically gated to accept counts representing either the up or down direction.

Figure 2:
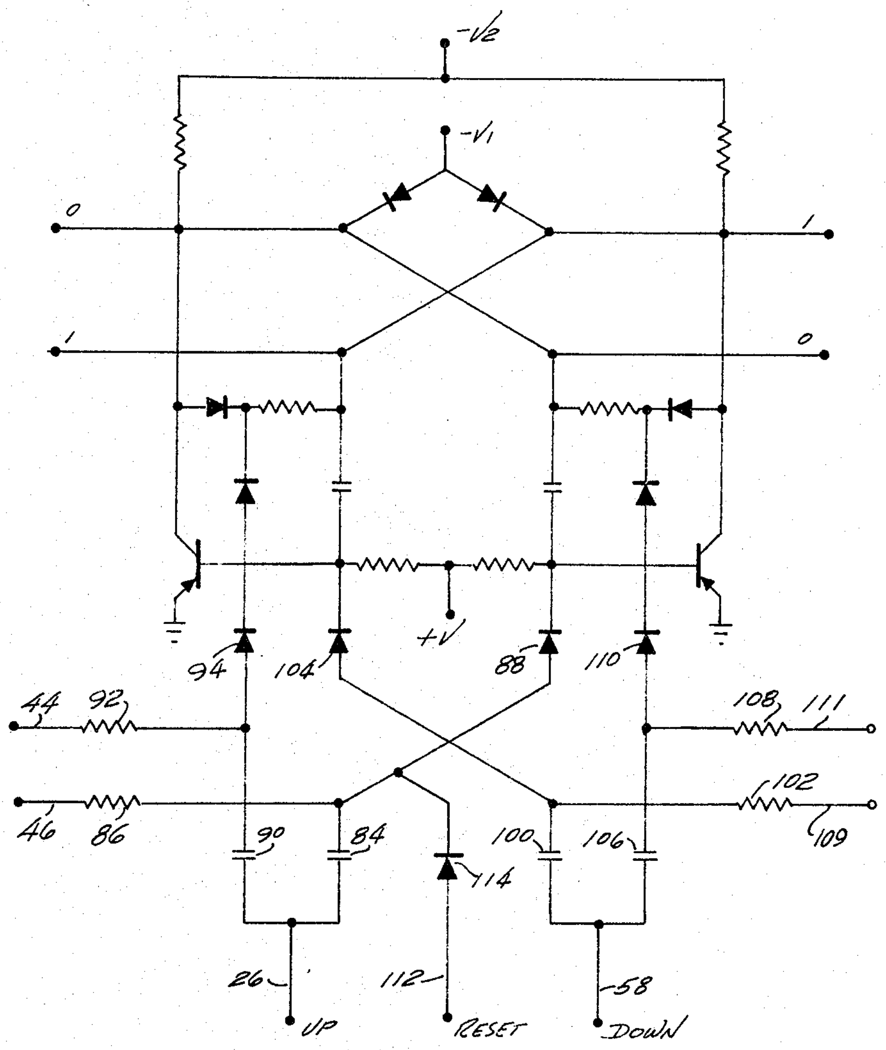
FIG. 2 is a schematic diagram of an individual flip-flop which may be employed in the embodiment of the invention shown in FIG. 1.

Referring now to FIG. 2, there is shown a schematic diagram of an individual flip-flop useful in the circuit of FIG. 1. Since the circuit shown is conventional and forms no part of the present invention it will not be described in detail herein, reference being made to any standard transistor circuit handbook. Further, in order to reference the circuit of FIG. 2 to the block diagram of FIG. 1, it will be referred to as flip-flop 12, it being understood, however, that FIG. 2 is representative of any flip-flops 10 through 18 inclusive.

With respect now to FIG. 2, up signals provided by line 26 are coupled to AND circuit 40 (see FIG. 1) which comprises a capacitor 84, a resistor 86, and a diode 88. Similarly, these up signals are coupled to AND circuit 42 which comprises a capacitor 90, a resistor 92, and a diode 94. Additionally, down signals, provided by line 58, are coupled to AND circuits 96 and 98 (see FIG. 1) which comprise capacitor 100, resistor 102 and diode 104, and capacitor 106, resistor 108, and diode 110, respectively. The output of the preceding flip-flop, in this example flip-flop 10, is coupled by lines 44 and 46 to one end of resistors 86 and 92. The deenergized one of lines 46 and 48 effectively biases the diode associated therewith to direct the up signal through the other of the diodes, all as described above. In like manner, the output of the next succeeding flip-flop, in this example flip-flop 14, is coupled by lines 109 and 111 to one end of resistors 102 and 108 to direct the down signal to the proper one of the set and reset inputs. Finally, provision is also included to reset the flip-flop to the 0 state by means of a line 112 and a diode 114.

Figure 3:
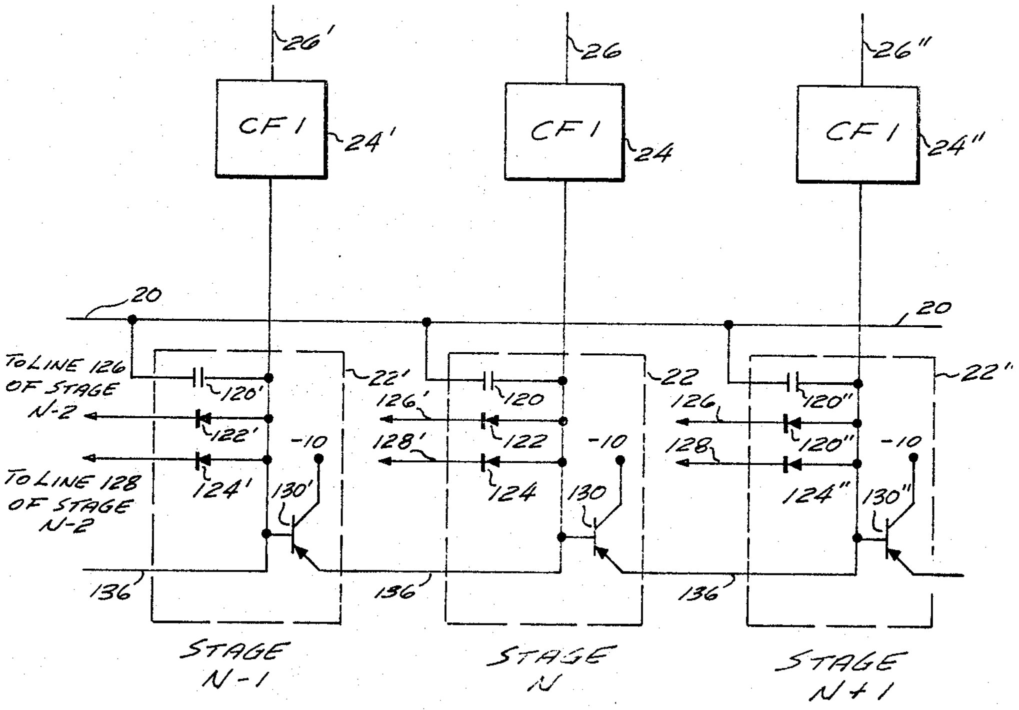
FIG. 3 is a block diagram of the interconnection of several decade bidirectional counters of the invention.

In order to obtain full advantage of the speed provided by a parallelly operated individual bidirectional decade counter stage when a plurality of such stages are cascaded together, the up and down signals are also supplied in parallel to all of the plurality of stages. In this manner, ripple-free carry is obtained, that is, the count operation and any necessary carry operation are performed simultaneously. The novel means of attaining this feature is shown in FIG. 3, wherein the AND circuits coupling line 20 to line 26 (see FIG. 1) are shown in detail for stages $N-1$, $N_1$ and $N+1$. For convenience, similar components of each stage have the same reference numerals attached thereto, the $N-1^{th}$ stage being differentiated from stage N by the use of primes, and by the $N+1^{th}$ stage being differentiated from stage N by the use of double primes.

As shown in FIG. 3 the up signals provided by line 20 are connected to capacitors 120', 120, and 120'' of AND circuits 22', 22, and 22'', respectively. Referring specifically now to stage N, this stage should count an up signal when, and only when, the count in stages $N-1$, $N-2$, $N-3$, etc., stands at nine, it being remembered that in a series of cascaded decimal counter stages the first stage thereof represents the least significant figure, that is, the first stage is effective to count each pulse, the second stage each tenth pulse, etc. That all of the preceding stages are set to nine is determined, first by connecting diodes 122 and 124 to lines 126' and 128' (see FIG. 1). Note that these lines are identified by primes to indicate that they originate in the $N-1^{th}$ stage. With reference now to FIG. 1, it can be seen that these lines are energized when flip-flop 16 is in the 0 state and flip-flop 18 is in the 1 state. Table I indicates that this condition is simultaneously obtained only when the count in the stage is at nine. Thus the energization of lines 126' and 128' is sufficient to determine that the count in the $N-1^{th}$ stage stands at nine. Additionally, the determination of the nine count in stages $N-2$, $N-3$, etc., is provided by transistor 130' of AND circuit 22'. Transistor 130' is normally conducting if either the $N-2$ stage is not set at nine (determined by diodes 122' and 124') or if any preceding stage, such as $N-3$, $N-4$, etc., is not set at nine, whereby the transistor corresponding to 130' would be conducting. Under the conventional logic rules, however, should the transistor immediately preceding transistor 130' along line 136 be cut off and the $N-2$ stage be set at nine (diodes 122' and 124' being connected to energized stages), transistor 130' itself is cut off, which together with the energization of lines 126' and 128' allows an up signal on line 20 to be applied to emitter follower 24. With transistor 130' cut off and lines 126' and 128' energized, transistor 130 is also cut off, thereby indicating to stage $N+1$ that all preceding stages through $N-1$ are set at nine. AND circuit 22'' of the $N+1^{th}$ stage then determines when stage N is set at nine by means of lines 126 and 128. For economy, generally all stages of the counter are wired exactly the same, even though AND circuit 22 is not necessary in the first stage of the chain, the only change being that diodes 122 and 124 of the first stage are not connected to lines 126 and 128 of the preceding stage but rather to lines 126 and 128 of the first stage itself.

In similar fashion, the down signals are parallelly applied to all of the decade stages, differing only in that the pair of diodes of AND circuit 54 (see FIG. 1) are coupled to the output lines of flip-flops 10 and 18 of the $N-1$ stage which, when energized, uniquely determine that a 0 is stored in the preceding stage combined with a similar transistor line as that shown in FIG. 3 to determine whether or not a 0 is stored in all the remainder of the preceding stages.

Figure 4:
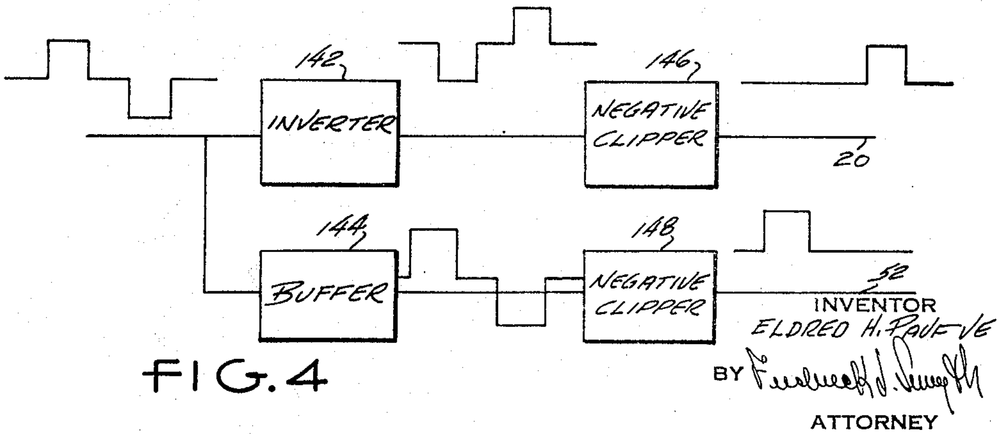
FIG. 4 is a block diagram illustrating one method of applying signals to the circuit of FIG. 1.

Although there are a number of methods of providing up and down signals, a typical circuit may, by way of example, provide pulses of opposite polarity, one polarity representing an up signal and the other representing a down signal. Circuitry for applying such signals to the counter of the present invention is shown in FIG. 4. As there shown, bipolar pulses supplied along a line 140 are applied in parallel to an inverter 142 and a buffer 144, the output of each being applied to negative clippers 146 and 148, respectively. The output of clippers 146 and 148 may then be coupled to lines 20 and 52 of FIG. 1 to provide input signals to the above described bidirectional counter of the present invention.

Although the bidirectional counter of the invention has been illustrated as employing transistor flip-flops in the preferred embodiments, it should be understood by those skilled in the art, that the counter is readily adaptable for use with many other types of flip-flops such as, by way of example, electronic, electromechanical, cryogenic, etc.

While the invention has been shown and described with reference to preferred embodiments thereof, it will be understood that various changes in form and details may be made therein without departing from the spirit and scope of the invention.

What is claimed is:

1. A bidirectional decade counter comprising, (a) first, second, third, fourth, and fifth bistable devices, each of said devices including first and second inputs and first and second outputs;

(b) first coupling means for connecting said first output of said first, second, third, and fourth devices to said second input of said second, third, fourth and fifth devices, respectively, and said second output of said first, second, third, and fourth devices to said first input of said second, third, fourth, and fifth devices, respectively;

(c) second coupling means for connecting said first output of said fifth device to said first input of said first device and said second output of said fifth device to said second input of said first device;

(d) third coupling means for connecting said first output of said second, third, fourth, and fifth devices to said second input of said first, second, third, and fourth devices, respectively, and said second output of said second, third, fourth, and fifth devices to said first input of said first, second, third, and fourth devices, respectively;

(e) fourth coupling means for connecting said first output of said first device to said first input of said fifth device and said second output of said first device to said second input of said fifth device;

(f) a source of up signals;

(g) a source of down signals;

(h) fifth coupling means for connecting said source of up signals to said first and second coupling means; and (i) sixth coupling means for connecting said source of down signals to said third and fourth coupling means.

2. A bidirectional counter comprising, (a) a plurality of flip-flops having first and second inputs and first and second outputs;

(b) first means logically connecting the first output of all but one of said flip-flops to the second input of its succeeding flip-flop and the second output of all but said one flip-flop to the first input of said succeeding flip-flop, and the first and second outputs of said one flip-flop to the first and second inputs, respectively, of its succeeding flip-flop;

(c) second means logically connecting the first output of all flip-flops but the flip-flop succeeding said one flip-flop to the second input of its preceding flip-flop and the second output of all flip-flops but the flip-flop succeeding said one flip-flop to the first input of said preceding flip-flop and the first and second outputs of said flip-flop succeeding said one flip-flop to the first and second inputs, respectively, of said one flip-flop;

(d) a source of up signals;

(e) a source of down signals;

(f) means coupling said source of up signals to said first means; and (g) means coupling said source of down signals to said second means.

3. The counter of claim 2 wherein said plurality of flip-flops is equal in number to one-half the radix of said counter.

4. The counter of claim 3 wherein said radix is ten.

References Cited by the Examiner

UNITED STATES PATENTS

| | | | |
|---|---|---|---|
| 3,005,917 | 10/1961 | Hofmann | 307—88.5 |
| 3,048,711 | 8/1962 | Hofmann | 307—88.5 |
| 3,067,341 | 12/1962 | Kunzke | 307—88.5 |
| 3,192,406 | 6/1965 | Somlyody | 307—88.5 |

ARTHUR GAUSS, *Primary Examiner*.

S. D. MILLER, *Assistant Examiner*.